United States Patent [19]
Ionov

[11] Patent Number: 6,154,596
[45] Date of Patent: Nov. 28, 2000

[54] FRONT END PREPARATION PROCEDURE FOR EFFICIENT COUPLING AND IMPROVED POWER HANDLING OF LIGHT INTO A MULTI-MODE FIBER

[75] Inventor: Stanislav I. Ionov, Calabasas, Calif.

[73] Assignee: Hughes Electronics Corporation, El Segundo, Calif.

[21] Appl. No.: 09/048,950

[22] Filed: Mar. 26, 1998

[51] Int. Cl.[7] .................................. G02B 6/02; G02B 6/22

[52] U.S. Cl. ........................... 385/128; 385/126; 385/88; 385/139; 427/163.2

[58] Field of Search ..................................... 385/123–128, 385/88, 139; 427/163.2

[56] References Cited

U.S. PATENT DOCUMENTS

| | | | |
|---|---|---|---|
| 4,290,668 | 9/1981 | Ellis et al. ................................ | 385/128 |
| 5,100,507 | 3/1992 | Cholewa et al. ......................... | 156/651 |
| 5,778,125 | 7/1998 | Busse et al. .............................. | 385/80 |
| 5,864,397 | 1/1999 | Vo-Dinh ................................... | 356/301 |
| 5,966,490 | 10/1999 | Minns et al. ............................. | 385/127 |

FOREIGN PATENT DOCUMENTS

| | | |
|---|---|---|
| 59-142509 | 8/1984 | Japan . |
| 2 068 142 | 8/1981 | United Kingdom . |

*Primary Examiner*—Hemang Sanghavi
*Attorney, Agent, or Firm*—V. D. Duraiswamy; M. W. Sales

[57] ABSTRACT

A method of front end preparation for efficient coupling of light into a fiber while preventing fiber damage from an incident beam, includes the steps of stripping an end of an outer cladding of the fiber. The step of stripping produces a stripped end of the fiber. The stripped end is then coated with a polymer to produce a polymer coating such that a length of a core of a multi-mode fiber (or an inner cladding of a single-mode double cladding fiber) is bare beyond the polymer coating. Thereby, an extended end of the core or inner cladding is left. For a portion of an incident beam that misses the core or inner cladding, such portion is allowed to diffract from the extended end, while leaving the fiber undamaged.

29 Claims, 2 Drawing Sheets

FRONT END PREPARATION PROCEDURE FOR EFFICIENT COUPLING AND IMPROVED POWER HANDLING OF LIGHT INTO A MULTI-MODE FIBER

BACKGROUND OF THE INVENTION

1. Field of the Invention

The present invention generally relates to optical fibers and, more specifically to double cladding and multi-mode fibers that more efficiently couple an incident power beam, as well as improved methods of treating such fibers for improving coupling efficiency.

2. Description of Related Art

Multi-mode fibers, including double cladding fibers, are often designed with high numerical apertures (i.e., greater than about 0.3) in an attempt to achieve the maximum use of a multi-mode incident power beam. Such fibers often use synthetic materials in their claddings, as those offer small refractive indexes, thus maximizing the numerical aperture of the fiber. When high-power incident beams (i.e., on the order of about 1 W and more) are used, even small power leakages outside of the core (or inner cladding) frequently damage the fibers beyond use.

Past efforts to minimize or eliminate fiber damage from the above type of power leakage have included elaborate optical imaging schemes. For example, an incident beam is passed through a first objective to focus the beam through an aperture. The aperture is sized to be larger than the cross section of the fiber core, yet small enough to remove wings from the incident beam. The incident beam then passes through a second objective that images the aperture onto the front end of the fiber core. It can be seen, however, that such a design scheme adds bulk and complexity to the overall system, as compared to a scheme which does not require the first objective and aperture.

Given the bulkiness of the above design scheme, efforts have been made to eliminate the first objective and aperture by stripping the cladding and then cleaving or polishing the core (or inner cladding). That procedure provides a rugged end which is less susceptible to burning when a launched beam extends beyond the core (or inner cladding). That lessened susceptibility is due to the fact that the non-coupled portion of the launched beam is unable to impinge the cladding, which would otherwise be disposed immediately adjacent the core (or inner cladding) and launched beam interface. Instead, the non-coupled portion of the launched beam is diffracted away from the fiber because the cladding has been stripped from the end of the fiber.

But the process of stripping and cleaving/polishing has its disadvantages. High losses result for incident rays propagating at relatively large angles with respect to the fiber axis. These losses occur at the edge of the stripped outer cladding, perhaps due to microcracks introduced to the outer cladding in the course of stripping. Consequently, the effective numerical aperture is reduced, thus reducing the overall coupling efficiency. Moreover, the power leakage at the edge of the stripped outer cladding may cause fiber damage at high levels of beam power. To avoid those coupling losses from high angle rays, the stripped end has been coated with a polymer having an index of refraction which is about the same as the index of refraction of the cladding. In so doing, a polymer coating is formed over the edge of remaining outer cladding and the stripped portion of the core.

Still, even though the coupling losses are minimized with the polymer coating, disadvantages are present. When a portion of the high power launched beam misses the core (or inner cladding), the fiber can easily burn since the beam reaches the polymer coating. That disadvantage has sought to be addressed by the use of the multiple objectives and aperture described above. Therefore, the disadvantage of bulk again arises, as do issues of being labor intensive to set up and maintain the system. Also, such system design is sensitive to temperature variances and environmental vibration, both of which can cause shifting of the system components. Misalignments from such shifting can eventually lead to fiber damage.

As can be seen, there is a need for improved methods of treating high numerical aperture fibers to minimize potential damage from the wings of a launched beam which miss the core (or inner cladding). There is also a need for such methods that are easy, inexpensive, and quick, yet still effective in increasing coupling efficiency. Additionally, there is a need to omit the requirement of multiple components to launch a beam into a fiber while still minimizing the potential for fiber damage. A need also exits for improved fibers, both multi-mode and single mode double cladded, which are less susceptible to damage from the non-coupled portion of a launched beam.

SUMMARY OF THE INVENTION

The present invention is directed to an improved method of treating the front end of a fiber in order to reduce the possibility of damage which would otherwise result from a non-coupled portion of a launched beam missing the core of a multi-mode fiber or the inner cladding of a single mode double cladded fiber. The invention is also directed to an improved fiber that provides good coupling efficiency, is easy to produce, eliminates complicated alignment, and increases flexibility of use.

Specifically, the improved method of treating a fiber includes stripping an end of the cladding (outer cladding for a double cladding fiber) to produce a stripped end. The stripped end is coated with a polymer in such a way that a portion of the stripped fiber remains bare at the fiber end, whereas the transition between the original cladding and the stripped end is thoroughly covered. The portion of the bare core (or inner cladding) can be cleaved or polished after or before the coating.

In the improved multi-mode fiber, the fiber has a cladding, a polymer coating over the cladding, and a core within the cladding. The core has an extended end that extends outside of the polymer coating, as well as the cladding. The extended end is either cleaved or polished. The length of the extended end is sufficient such that the portion of a launched beam that misses the core diffracts away rather than being received by either the cladding or polymer coating. Similarly, the improved single mode, double cladding fiber includes an outer cladding having an end, a polymer coating over the outer cladding, and an inner cladding within the outer cladding. The inner cladding has an extended, bare portion outside of the polymer coating and the end of the outer cladding.

These and other features, aspects and advantages of the present invention will become better understood with reference to the following drawings, description, and claims.

DESCRIPTION OF THE PREFERRED EMBODIMENTS

Figure 1:
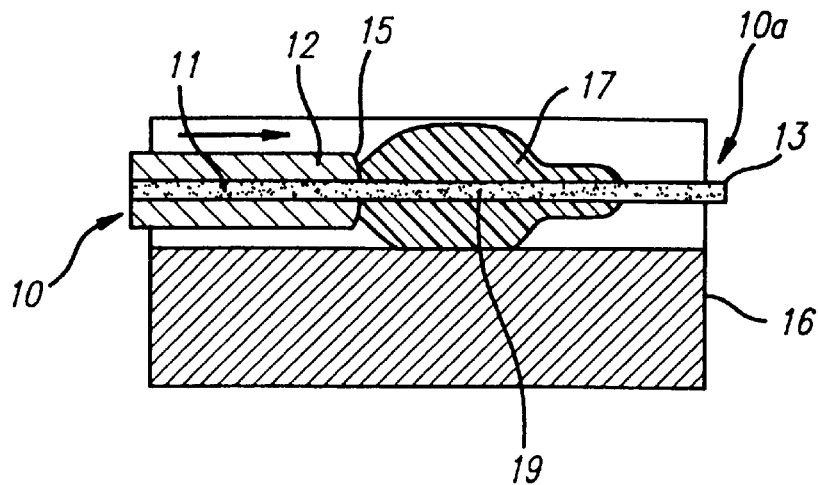
FIG. 1 is depicts a process of preparing a front end of a fiber according to an embodiment of the present invention.
Figure 2:
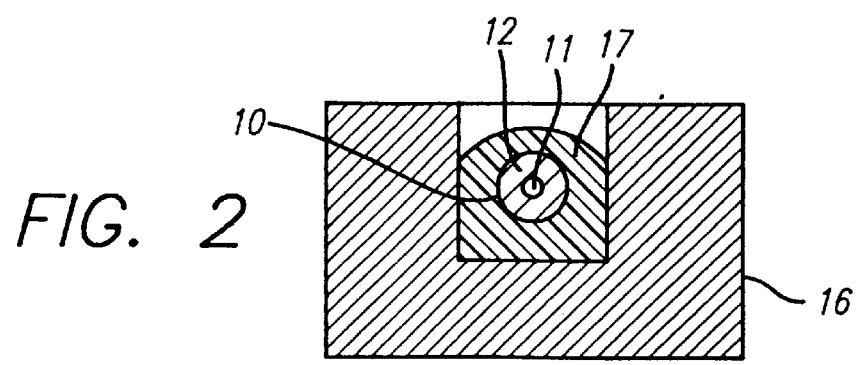
FIG. 2 is an end, cross sectional view of the fiber shown in FIG. 1.
Figure 3:
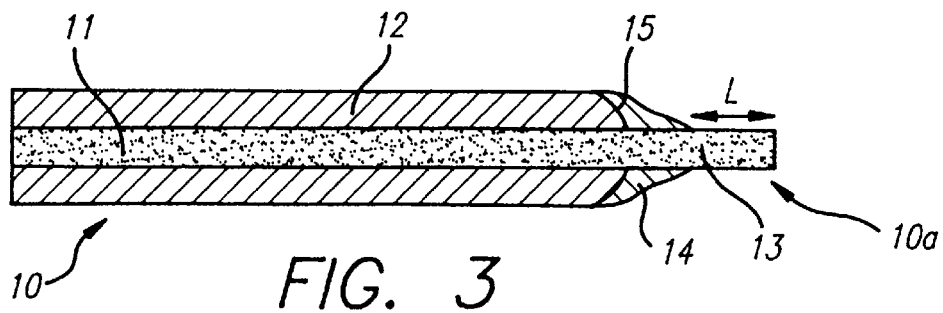
FIG. 3 is a side, cross sectional view a fiber according to an embodiment of the present invention.
Figure 4:
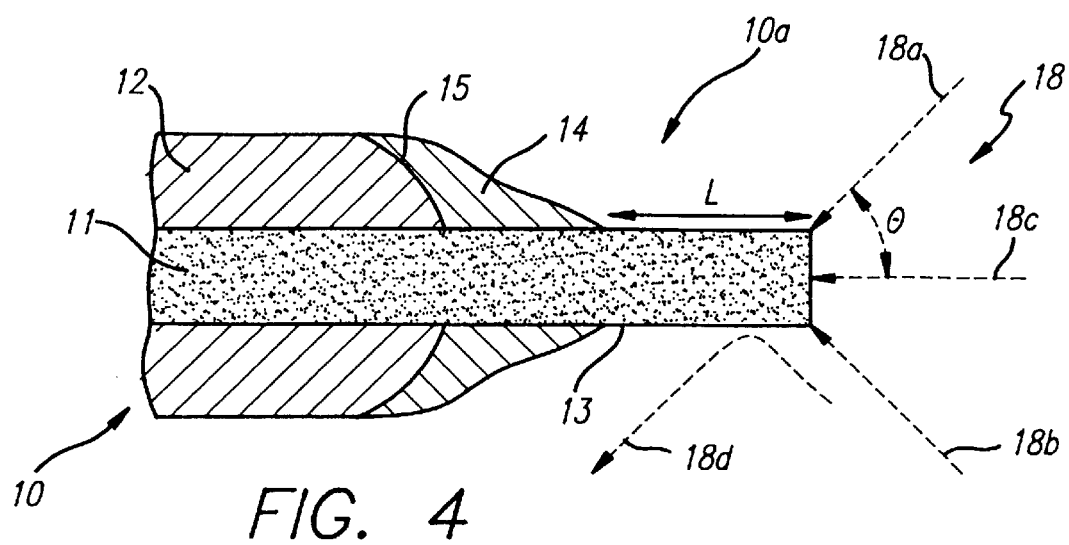
FIG. 4 is a side, cross sectional view of launched beams and a front end of the fiber shown in FIG. 3.

In FIG. 1, a preferred embodiment of the present invention for treating a fiber 10 is shown. The fiber 10 is intended to refer to at least a multi-mode fiber and a double cladding fiber. Thus, as shown in FIGS. 1–3, the fiber 10 comprises a core 11 in the case of a multi-mode fiber or an inner cladding 11 in the case of a double cladding fiber. Typically, the core 11 is made of quartz for either a multi-mode fiber or single mode double cladding fiber, although the composition is not a part of the present invention. A cladding 12 surrounds the core 11 in the case of a multi-mode fiber or the inner cladding 11 in the case of a double cladding fiber. Again, for either type of fiber, the cladding 12 is typically made of low-index silicone rubber but the specific composition is not a part of the invention. A front end 10a is the end of the fiber 10 into which an incident or power beam 18 is launched, as indicated in FIG. 4. Therefore, it is the front end 10a which is treated, according to an embodiment of the present invention. However, as further described below, the end of the fiber 10 which is opposite the front end 10a can be treated according to the present invention, either alone or in conjunction with the front end 10a being treated.

Although not shown in FIG. 1, the fiber 10 is first treated by stripping a portion of the outer cladding 12 away from the core (or inner cladding) 11. The method of stripping can be accomplished by various methods that enable the outer cladding 12 to be removed while leaving the core (or inner cladding) 11 undamaged. For example, the outer cladding 12 can be stripped by the use of fiber strippers, or even as simply by the use of a person's fingernails. The amount of stripping of the outer cladding 12 required, as measured along the length of the longitudinal axis of the fiber 10, can vary. For the most part, the amount of stripping is dictated by a length of an extended, bare end 13 of the core (or inner cladding) 11, which is further described below. Nevertheless, it can be generally noted that the longer the extended, bare end 13, the more stripping is needed, and vice versa.

As a result of the stripping step, the outer cladding 12 is left with a cladding edge or end 15. Thereby, a stripped portion or end 19 of the core (or inner cladding) 11 extends from the cladding edge 15 but is stripped of the outer cladding 12, as best shown in FIGS. 1 and 3. Importantly, the stripping step tends to leave micro-cracks in the outer cladding 12. These micro-cracks are along the longitudinal interface of the inner cladding 12 and the core (or inner cladding) 11 near the cladding edge 15. The micro-cracks result in a loss in coupling efficiency by scattering high angle rays from the incident beam 18 where the micro-cracks are located.

A polymer coating 14 can be applied by placing the fiber 10 in a chuck 16 and moving the fiber 10 through a polymer source 17, as shown in FIG. 1. The polymer source 17 tends to fill the voids from the micro-cracks described above. Preferably, the polymer source 17 comprises a polymer having a polymer refraction index which is substantially the same as a cladding refraction index of the outer cladding 12 and also has low absorption at the wavelength of the incident beam 18. And since the polymer 17 perhaps tends to fill the voids in the micro-cracks, there is a minimization of losses at the micro-cracks. For example, in the case of a double cladding fiber 10 with a Yb-doped single mode core manufactured by NOI, the outer cladding 12 has a refraction index of ~1.392 for a 1 μm wavelength. Thus, the polymer source 17 can be Epo Tek 392 which has a refraction index of ~1.392 for a 1 μm wavelength. Importantly, fresh or thinned polymer 17 should be used so that it can penetrate and fill the micro-cracks.

In again referring to FIG. 1, it can be appreciated that when the fiber 10 is moved through the polymer source 17, a polymer coating 14 is formed on the fiber 10. Specifically, the polymer coating 14 is formed about the stripped end 19 of the core (or inner cladding) 11, as well as the cladding edge 15. It can be seen in FIG. 3 that the polymer coating 14 has coated only a first part of the stripped end 19 of the core (or inner cladding) 11, with the first part being disposed immediately adjacent to the cladding edge 15. By avoiding physical contact with the polymer source 17, a second part of the stripped end portion 19 or, in other words, the bare end 13 of the core (or inner cladding) extends outside of the polymer coating 14, as well as outside or beyond the end or edge 15 of the outer cladding 12. As can be seen in FIG. 1, the second part of the stripped end 19 is disposed immediately adjacent the front end 10a.

The length of the extended, bare end 13, as denoted by the symbol L in FIGS. 3 and 4, varies with a varying numerical aperture (NA) of the fiber 10. Generally, as can be seen below, a higher numerical aperture requires a shorter extended end 13. The relationship between NA and the length L is best described in reference to FIG. 4. Therein, the part of the incident beam 18 which enters the core (or inner cladding) 11 falls between the incident rays 18a, 18b. An angle described between the incident rays 18a, 18b is equal to 2θ whereby θ is an angle between the incident ray 18a and an incident ray 18c which bisects in half the angle between rays 18a, 18b. Since NA=sin (θ), then L>a/tan θ wherein a equals the size of the core (or inner cladding) 11, such as the diameter for a round cross sectional core or the length of the longer side for a rectangular cross sectional core. Alternatively, L>a/tan(arcsin(NA)). Therefore, as the angle θ increases, the NA increases, and so the required length L of the extended, bare end 13 diminishes.

In fact, it is preferred that L>>a/tan θ. Having a longer L provides more assurance that the fiber 10 will not be damaged from a part of the incident beam 18 that misses the core (or inner cladding) 11. For example, an unwanted ray, such as ray 18d in FIG. 4, can be part of the wing on a Gaussian distribution curve. If the wing which includes ray 18d misses the core (or inner cladding) 11, the ray 18d can impinge the extended, bare end 13. And such impingement could have caused fiber damage if the polymer coating 14 and/or outer cladding 12 extended to the extreme point of the front end of the core (or inner cladding) 11. But since the present invention provides an extended, bare end 13 which is substantially uncovered by either the polymer coating 14 and outer cladding 12, the unwanted ray 18d can impinge the fiber 10 and diffract away without significant damage. Of course, the longer the extended end 13, the less of a chance of an unwanted ray being able to reach the polymer coating 14 and/or inner cladding 12.

The extended end 13 is either cleaved or polished, which can be done either before or after the coating step. Preferably, however, such polishing or cleaving occurs after the coating step to better ensure that the polymer 17 does not coat the extreme point of the front end of the core (or inner cladding) 11. Cleaving can be accomplished by various means in order to provide a uniform finish to the extended end 13 and thereby give good coupling with the incident beam 18. For example, the extended end 13 may be cleaved by using a diamond to create an initial cut or scratch in the core (or inner cladding) 11. The cut or scratch then makes it relatively easy to bend, pull or twist the core (or inner cladding) 11 to complete the cleaving. Polishing of the extended end 13 can also be performed by various means to achieve a uniform finish, such as by using commercial equipment from various manufacturers, e.g., Buhler.

As noted above, the treatment steps according to the present invention can be usefully applied to the end of the fiber 10 which is opposite the front end 10a. This is because damage (i.e., burning) to the fiber 10 can occur at the end where the light exits, particularly at higher powers. Such damage can occur at the edge of the outer cladding 12 where a portion of the beam power is scattered out of the core 11 on microcracks introduced to the outer cladding 12 in the course of stripping. But by treating the end at which the light exits with the steps of stripping, coating, and polishing/cleaving, as described above, damage can be avoided.

EXAMPLES

Double cladding fibers with a Yb-doped single mode core manufactured by NOI were tested. The fibers were about 10–20 cm long and had a silicone rubber outer cladding and a 58×80 $\mu$m rectangular quartz inner cladding. The fiber NA was ~0.35–0.4. Two fibers were first stripped of their outer cladding by the use of commercial 105 $\mu$m strippers. The fibers were then cleaved by a York F11 cleaver so that the remaining length of the stripped portion was approximately 10–15 mm. The fibers were then illuminated by a 915 nm high NA beam with a nearly "top-hat" intensity distribution. The distribution was obtained by overfilling a 23 mm focal length objective (NA=0.38) by a Gaussian $TEM_{00}$ beam from a Ti:Saphire laser. The beam intensity was kept substantially below lasing threshold for the doped fibers. After optimizing the respective beam and fiber alignment, transmitted power was measured by a Coherent Fieldmaster detector and showed 80 $\mu$W and 70 $\mu$W for the two samples, respectively.

The fibers were placed in a chuck having a pool of Epo Tek 392 polymer. The fibers were drawn through the polymer pool to form a smooth coating over the stripped portion of the fibers, while leaving about 2 to 7 mm of the far end of the stripped fibers uncoated. Leaving the end uncoated was accomplished by avoiding their physical contact with the polymer. The fibers were again illuminated by a 915 nm high NA beam with a nearly top hat intensity distribution. Again, the beam intensity was kept substantially below lasing threshold for the doped fibers. After optimizing the respective beam and fiber alignment, transmitted power was measured by a Fieldmaster detector manufactured by Coherent, Inc. and showed 118 $\mu$W and 103 $\mu$W for the two samples, respectively.

Tests were also conducted with the above NOI fibers which had been prepared by stripping and coating, as described above. The fibers were illuminated by an array of six proprietary surface-emitting, distributed feedback diodes manufactured by Hughes Danbury Optical Systems, Inc. The beam incident onto the fiber has an NA of ~0.35. The intensity distribution of the incident beams had a considerable fraction of power, about 35%–45%, extending beyond the entrance face of the fibers, as measured by a Cohu solid-state CCD camera. The stripped and coated fibers withstood up to about 11.6 W of incident power without burning. Transmitted power was measured by a Coherent 210 power meter and showed coupling efficiencies of about 51% to 56%. Those results were slightly lower than expected according to the beam profile measurements of about 55% to 64%. The lower experimental results may be attributable to losses from imperfect fiber cleaves.

As a comparison of the ability to withstand high power, other NOI fibers were stripped and coated, but the coatings were allowed to extend to the very ends of the inner claddings, rather than maintaining extended ends of about 2 to 7 mm which were uncovered. The end of the fibers were then polished using a commercial fiber polisher manufactured by Buhler. Incident power beams of less than 1 W to these fibers resulted in immediate burning.

It should be understood, of course, that the foregoing relates to preferred embodiments of the invention and that modifications may be made without departing from the spirit and scope of the invention as set forth in the following claims.

What is claimed is:

1. A method for treating a fiber for increased coupling efficiency, said fiber comprising a core, a cladding and a front end, with the method comprising the steps of:

stripping an end of said cladding to produce a stripped end of said fiber; and coating a first part of said stripped end with a liquid polymer to fill micro-cracks in said stripped end and to form a solid polymer coating such that said polymer is substantially absent from a second part of said stripped end.

2. The method of claim 1, wherein said stripped end is disposed at said front end.

3. The method of claim 1, wherein said second part of said stripped end is disposed immediately adjacent to said front end.

4. The method of claim 1, further comprising the step of polishing said stripped end.

5. The method of claim 1, further comprising the step of cleaving said stripped end.

6. The method of claim 1, further comprising the step of filling voids with said polymer in said cladding adjacent to said stripped end.

7. The method of claim 1, wherein said fiber is a multimode fiber having a numerical aperature greater than about 0.3.

8. A method of preventing fiber damage from an incident beam, said fiber comprising a front end, an inner cladding and an outer cladding with the method comprising the steps of:

stripping an end of said outer cladding, said step of stripping producing a stripped end of said fiber; and coating said stripped end with a liquid polymer, said step of coating filling micro-cracks in said stripped end and producing a solid polymer coating such that said polymer coating is substantially absent from a portion of said stripped end, said portion being immediately adjacent to said front end.

9. The method of claim 8, wherein the step of stripping comprises the step of producing an extended end of said inner cladding, said extended end extending outside of said outer cladding.

10. The method of claim 9, further comprising the step of substantially eliminating said polymer coating over said extended end.

11. The method of claim 9, further comprising the step of polishing said extended end.

12. The method of claim 9, further comprising the step of cleaving said extended end.

13. The method of claim 9, further comprising the step of moving said stripped end through a polymer source.

14. The method of claim 9, wherein said polymer has a polymer refraction index substantially the same as a cladding refraction index of said outer cladding.

15. The method of claim 9, wherein said extended end has a length L, whereby L>a/tan(arcsin (NA)), with a being a cross sectional size of said inner cladding and NA being a numerical aperture of said incident beam.

16. The method of claim 9, wherein said fiber is a single mode, double cladding fiber.

17. An improved optical fiber comprising:

a cladding having a cladding edge;

a solid polymer coating over said cladding edge, said solid polymer coating applied over said cladding edge in liquid form; and a core within said cladding, said core having an extended end that extends outside of said solid polymer coating, said extended end having micro-cracks filled by said solid polymer coating.

18. The fiber of claim 17, wherein said extended end extends outside of said cladding.

19. The fiber of claim 17, wherein said fiber further comprises a front end and said extended end is immediately adjacent to said front end.

20. The fiber of claim 17, wherein said extended end has a length L, whereby L>a/tan(arcsin (NA)), with a being a cross sectional size of said inner cladding and NA being a numerical aperture of an incident beam to be coupled to said fiber.

21. The fiber of claim 17, wherein said fiber is a multimode fiber having a numerical aperture greater than about 0.3.

22. An improved double cladding fiber, comprising:

an outer cladding having a cladding end;

a solid polymer coating over said outer cladding end, said solid polymer coating applied over said cladding end in liquid form; and an inner cladding within said outer cladding, said inner cladding having an exposed end outside of said solid polymer coating and said cladding end of the outer cladding, said exposed end having micro-cracks filled by said solid polymer coating.

23. The fiber of claim 22, wherein said polymer coating coats said inner cladding.

24. The fiber of claim 22, wherein said polymer coating comprises a polymer having a polymer refraction index substantially the same as a cladding refraction index of said outer cladding.

25. The fiber of claim 22, wherein said exposed end is end cleaved.

26. The fiber of claim 22, wherein said exposed end is polished.

27. The fiber of claim 22, wherein said exposed end has a length L, whereby L>a/tan(arcsin (NA)), with a being a cross sectional size of said inner cladding and NA being a numerical aperture of an incident beam to be coupled to said fiber.

28. The fiber of claim 22, wherein said cladding end of the outer cladding is stripped.

29. The fiber of claim 22, wherein said fiber is a single mode, double cladded fiber having a numerical aperture greater than about 0.3.

* * * * *